United States Patent
Sourour et al.

(10) Patent No.: US 6,377,615 B1
(45) Date of Patent: Apr. 23, 2002

(54) APPARATUS AND METHODS FOR RECEIVING INFORMATION USING VARIABLE LENGTH ACCUMULATION SEARCHERS

(75) Inventors: Essam A. Sourour, Cary; Clarence V. Roberts, Raleigh, both of NC (US)

(73) Assignee: Ericsson Inc., Research Triangle Park, NC (US)

( * ) Notice: Subject to any disclaimer, the term of this patent is extended or adjusted under 35 U.S.C. 154(b) by 0 days.

(21) Appl. No.: 09/408,624

(22) Filed: Sep. 30, 1999

(51) Int. Cl.[7] .......................... A61F 2/06; H04L 27/30
(52) U.S. Cl. ........................... 375/150; 375/142
(58) Field of Search .................... 370/209, 342, 370/500, 51 J, 149, 519; 375/130, 140, 142, 143, 147, 150, 152

(56) References Cited

U.S. PATENT DOCUMENTS

| | | | | |
|---|---|---|---|---|
| 5,577,025 A | * | 11/1996 | Skinner et al. | 370/209 |
| 5,644,591 A | * | 7/1997 | Sutton | 375/142 |
| 5,727,018 A | | 3/1998 | Wolf et al. | 375/210 |
| 5,950,131 A | | 9/1999 | Vilmur | 455/434 |

FOREIGN PATENT DOCUMENTS

| | | |
|---|---|---|
| EP | 0 930 723 A2 | 7/1999 |
| GB | 2 318 952 A | 5/1998 |
| WO | WO-01/01594 A1 * | 1/2001 |

OTHER PUBLICATIONS

U.S. application No. 09/168,233, Sourour et al., filed Oct. 07, 1998.
U.S. application No. 09/096,960, Sourour et al., filed Jun. 12, 1998.
U.S. application No. 09/024,120, Sourour et al., filed Feb. 17, 1998.
U.S. application No. 09/005,580, Sourour et al., filed Jan. 12, 1998.
International Search Report, PCT/US/00/21847, Dec. 8, 2000.

\* cited by examiner

*Primary Examiner*—Jean Corrielus
(74) *Attorney, Agent, or Firm*—Myers Bigel Sibley & Sajovec

(57) ABSTRACT

Delays in a spread spectrum signal transmitted in a communications medium according to a spreading sequence may be determined by receiving a composite signal including the spread spectrum signal from the communications medium. The composite signal is correlated with the spreading sequence according to a first correlation length, to produce first time-offset correlations of the composite signal with the spreading sequence. Selected ones of the first time-offset correlations of the composite signal then are further correlated with the spreading sequence according to a second correlation length that is longer than the first correlation length, to produce second time-offset correlations of the composite signal with the spreading sequence. At least one of the second time-offset correlations may be selected. By providing variable length accumulation searchers, power and/or processing time can be saved by performing limited correlations for those delays that do not appear to be qualified candidates to be ultimately selected.

30 Claims, 6 Drawing Sheets

APPARATUS AND METHODS FOR RECEIVING INFORMATION USING VARIABLE LENGTH ACCUMULATION SEARCHERS

FIELD OF THE INVENTION

The present invention relates to communications methods and apparatus, and more particularly, to spread spectrum communications methods and apparatus.

BACKGROUND OF THE INVENTION

Wireless communications systems are commonly employed to provide voice and data communications to subscribers. For example, analog cellular radiotelephone systems, such as those designated AMPS, ETACS, NMT-450, and NMT-900, have long been deployed successfully throughout the world. Digital cellular radiotelephone systems such as those conforming to the North American standard IS-54 and the European standard GSM have been in service since the early 1990's. More recently, a wide variety of wireless digital services broadly labeled as PCS (Personal Communications Services) have been introduced, including advanced digital cellular systems conforming to standards such as IS-136 and IS-95, lower-power systems such as DECT (Digital Enhanced Cordless Telephone) and data communications services such as CDPD (Cellular Digital Packet Data). These and other systems are described in *The Mobile Communications Handbook*, edited by Gibson and published by CRC Press (1996).

FIG. 1 illustrates a conventional terrestrial cellular radiotelephone communication system 20. The cellular radiotelephone communication system 20 may include one or more radiotelephones (terminals) 22, communicating with a plurality of cells 24 served by base stations 26 and a mobile telephone switching office (MTSO) 28. Although only three cells 24 are shown in FIG. 1, a typical cellular network may include hundreds of cells, may include more than one MTSO, and may serve thousands of radiotelephones.

The cells 24 generally serve as nodes in the communication system 20, from which links are established between radiotelephones 22 and the MTSO 28, by way of the base stations 26 serving the cells 24. Each cell 24 will have allocated to it one or more dedicated control channels and one or more traffic channels. A control channel is a dedicated channel used for transmitting cell identification and paging information. The traffic channels carry the voice and data information. Through the cellular network 20, a duplex radio communication link may be effected between two mobile terminals 22 or between a mobile terminal 22 and a landline telephone user 32 through a Public Switched Telephone Network (PSTN) 34. The function of a base station 26 is to handle radio communication between a cell 24 and mobile terminals 22. In this capacity, a base station 26 functions as a relay station for data and voice signals.

As illustrated in FIG. 2, a satellite 42 may be employed to perform similar functions to those performed by a conventional terrestrial base station, for example, to serve areas in which population is sparsely distributed or which have rugged topography that tends to make conventional landline telephone or terrestrial cellular telephone infrastructure technically or economically impractical. A satellite radiotelephone system 40 typically includes one or more satellites 42 that serve as relays or transponders between one or more earth stations 44 and terminals 23. The satellite conveys radiotelephone communications over duplex links 46 to terminals 23 and an earth station 44. The earth station 44 may in turn be connected to the PSTN 34, allowing communications between satellite radiotelephones, and communications between satellite radio telephones and conventional terrestrial cellular radiotelephones or landline telephones. The satellite radiotelephone system 40 may utilize a single antenna beam covering the entire area served by the system, or, as shown, the satellite may be designed such that it produces multiple minimally-overlapping beams 48, each serving distinct geographical coverage areas 50 in the system's service region. The coverage areas 50 serve a similar function to the cells 24 of the terrestrial cellular system 20 of FIG. 1.

Several types of access techniques are conventionally used to provide wireless services to users of wireless systems such as those illustrated in FIGS. 1 and 2. Traditional analog cellular systems generally employ a system referred to as Frequency Division Multiple Access (FDMA) to create communications channels, wherein discrete frequency bands serve as channels over which cellular terminals communicate with cellular base stations. Typically, these bands are reused in geographically separated cells in order to increase system capacity.

Modern digital wireless systems typically utilize different multiple access techniques such as Time Division Multiple Access (TDMA) and/or Code Division Multiple Access (CDMA) to provide increased spectral efficiency. In TDMA systems, such as those conforming to the GSM or IS-136 standards, carriers are divided into sequential time slots that are assigned to multiple channels such that a plurality of channels may be multiplexed on a single carrier. CDMA systems, such as those conforming to the IS-95 standard, achieve increased channel capacity by using "spread spectrum" techniques wherein a channel is defined by modulating a data-modulated carrier signal by a unique spreading code, i.e., a code that spreads an original data-modulated carrier over a wide portion of the frequency spectrum in which the communications system operates.

Conventional spread-spectrum CDMA communications systems commonly use so-called "direct sequence" (DS) spread spectrum modulation. In direct sequence modulation, a data-modulated carrier is directly modulated by a spreading code or sequence before being amplified by a power amplifier and transmitted over a communications medium, e.g., an air interface. The spreading code typically includes a sequence of "chips" occurring at a chip rate that typically is much higher than the bit rate of the data being transmitted.

Typical transmit operations of such a system are illustrated in FIG. 3. Data streams from different users are subjected to various signal processing steps, such as error correction coding or interleaving, and spread using a combination of a user specific spreading code and a group-specific scrambling code. The coded data streams from the users are then combined, subjected to carrier modulation and transmitted as a composite signal in a communications medium.

A so-called RAKE receiver structure is commonly used to recover information corresponding to one of the user data streams. In a typical RAKE receiver, a received composite signal is typically correlated with a particular spreading sequence assigned to the receiver to produce a plurality of time-offset correlations, a respective one of which corresponds to an echo of a transmitted spread spectrum signal. The correlations are then combined in a weighted fashion, i.e., respective correlations are multiplied by respective weighting factors and then summed to produce a decision statistic. The correlations generally are performed in a plurality of correlating fingers in the RAKE receiver, wherein each finger is synchronized with a channel path. The output of all fingers are combined to allow an improvement in the overall signal-to-noise ratio of the received signal. The design and operation of RAKE receivers are well known to those having the skill in the art and need not be described further herein.

In order to maintain the RAKE receiver fingers synchronized with their respective channel paths, a delay searcher may be used to support the RAKE receiver. The delay searcher can continuously search for new channel paths and estimate their delays. These delays then are assigned to RAKE fingers. A delay searcher also is referred to herein as a "searcher". A delay tracker also may be used to continuously track the delays assigned to the RAKE fingers, to thereby allow improved accuracy of the delay estimates made by the delay searcher.

An embodiment of a delay searcher is described in U.S. Pat. No. 6,157,820 to Sourour et al., entitled Pilot Strength Measurement and Multipath Delay Searcher for CDMA Receiver, and assigned to the assignee of the present application, the disclosure of which is hereby incorporated herein by reference and in UK Patent Serial No. GB 2318952 to Vilmue, entitled Fast Pilot Channel Acquisition Using Matched Filter in a CDMA Radiotelephone, the disclosure of which is hereby incorporated herein by reference. An embodiment of a delay tracker is described in U.S. application Ser. No. 09/005,580 to Sourour et al., entitled Method and Apparatus for Multipath Delay Estimation in Direct Sequence Spread Spectrum Communication Systems, filed Jan. 12, 1998 and assigned to the assignee of the present application, the disclosure of which is hereby incorporated herein by reference. Finally, interaction between a delay searcher and delay trackers is described in U.S. application Ser. No. 09/168,233 to Sourour et al., entitled Delay Searcher and Delay Tracker Interaction for New Delays Assignment to RAKE Fingers, filed Oct. 7, 1998, assigned to the assignee of the present application, the disclosure of which is hereby incorporated herein by reference.

A delay searcher generally scans a wide search window of possible channel delays. For each delay in the search window, a long correlation generally is performed. More specifically, a typical multipath fading channel may include three or four channel paths. A conventional CDMA searcher that complies with the cellular standard TIA/EIA/IS-95 entitled *Mobile Station-Base Station Compatibility Standard for Dual Mode Wideband Spread Spectrum Cellular System* may search for channel paths over a wide window of delays around the delay of the first arriving path in the channel. This window of delays may be referred to as the search window.

According to the TIA/EIA/IS-95 standard noted above, a base station transmits a pilot channel comprising a fixed data value modulated by the pilot code. The pilot code includes a pseudo-random sequence of chips. For each delay position in the search window, the searcher generally performs a correlation between the received signal and the pilot code. After correlations for all delays are completed, the delays with the highest correlation magnitude may be selected as the correlations that correspond to the multipaths in the channels. These delays then are provided to the RAKE receiver. The search process may be repeated continuously to detect new channel paths and/or reject disappearing channel paths. See for example, the above-cited, U.S. Pat. No. 6,157,820 to Sourour et al.

As described above, the delay searcher scans a wide search window of possible channel delays. For each delay in the search window, the searcher generally performs a long correlation. Unfortunately, the correlation process may consume excessive power in the receiver. When the receiver is a portable radiotelephone or other portable terminal, excessive power consumption can unduly decrease the operational time and/or the standby time of the radiotelephone or other portable terminal. The correlation process also may consume excessive time in the receiver, which can reduce the operational efficiency thereof.

SUMMARY OF THE INVENTION

It is therefore an object of the present invention to provide apparatus and methods for determining channel delays in a spread spectrum signal that is transmitted in a communications medium according to a spreading sequence.

It is another object of the present invention to provide improved delay searching methods and apparatus that perform correlations over a search window of possible channel delays.

It is still another object of the present invention to provide delay searching methods and apparatus that can reduce power consumption when performing correlations.

These and other objects may be provided, according to the present invention, by correlating a composite signal including a spread spectrum signal from a communications medium with a local spreading sequence. Correlation is performed for a first set of time-offsets between the composite received signal and the local spreading sequence according to a first correlation length. Further correlations for decreasingly smaller subsets of time-offsets are performed according to increasingly longer correlation lengths to produce a final subset of at least one time-offset of the composite signal with the local spreading sequence.

The present invention stems from the realization that the final goal of the searcher is to detect a small number, such as three or four, channel delays, by selecting a small number of the largest correlation magnitudes in the search window. The remaining correlations are rejected. However, conventional searchers typically perform correlations between the received spread spectrum pilot code and the local replica of the pilot code for all delays in the search window, with equal correlation length. Thus, for example, for a typical search window of sixty chips as defined in Section 6.5.2 of the TIA/EIA/IS-95 standard (*Recommended Minimum Performance Standards for Dual-Mode Spread Spectrum Cellular and PCS Mobile Stations*), and a search precision of two delay positions per chip, the search window may perform 120 correlations, from which three or four are eventually selected. A considerable amount of power may be consumed in performing fall correlations for candidate delays that eventually will be rejected. According to the present invention, the correlation length for delays that do not appear to be qualified candidates may be shortened. This can significantly reduce the time and/or power consumption in the search.

More specifically, the present invention can determine channel delays when a spread spectrum signal is transmitted through a multipath communications medium. The composite signal is correlated with the spreading sequence according to a first correlation length, to produce a plurality of correlations corresponding to a first set of time-offsets. Selected correlations of the plurality of first correlations are further correlated with the spreading sequence according to a second correlation length that may be longer than the first correlation length, to produce a plurality of second correlations corresponding to a second set of time-offsets which is a subset of the first set. At least one of the plurality of second time-offset correlations may be selected.

It will be understood that the selected ones of the plurality of first time-offset correlations of the composite signal may be selected based upon the highest correlations or may be selected based upon correlations that exceed a predetermined threshold. Other selection criteria, or combinations of criteria, also may be used. When thresholds are used, succeedingly greater thresholds preferably are used. It also will be understood that after further correlating as described above, still further correlating may be performed. For example, selected ones of the plurality of second time-offset correlations of the composite signal may be correlated with the spreading sequence according to a third correlation length that may be longer than the second correlation length, to produce a plurality of third time-offset correlations of a composite signal with the spreading sequence. Additional correlation iterations may be performed.

Apparatus (systems) for determining channel time delays in a spread spectrum signal transmitted in a communications medium according to a spreading sequence, according to the present invention, preferably include a receiver that receives a composite signal including the spread spectrum signal from the communications medium. A variable length accumulation searcher correlates the composite signal with the spreading sequence according to a first correlation length, to produce a plurality of first time-offset correlations of the composite signal with the spreading sequence. The variable length accumulation searcher further correlates decreasingly smaller subsets of the plurality of first time-offset correlations of the composite signal with the spreading sequence according to increasingly longer correlation lengths, to produce a final subset of at least one time-offset correlation of the composite signal with the spreading sequence. During each correlation, the variable length accumulation searcher may select the time-offset correlations based on a highest correlation, correlations that exceed a threshold and/or other criteria.

A RAKE receiver is responsive to at least one of the final subset of at least one time-offset correlation of the composite signal with the spreading sequence in order to recover information encoded in the spread spectrum signal. Accordingly, by providing variable length accumulation searchers, power and/or processing time can be saved by performing limited correlations for those delays that do not appear to be qualified candidates to be ultimately selected. Improved spread spectrum receivers and receiving methods thereby may be provided.

DETAILED DESCRIPTION OF PREFERRED EMBODIMENTS

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

As will be appreciated by one of skill in the art, the present invention may be embodied as methods, systems (apparatus), and/or computer program products that recover information encoded in a spread spectrum signal. Accordingly, the present invention may take the form of an entirely hardware embodiment, an entirely software embodiment or an embodiment combining software and hardware aspects.

Various aspects of the present invention are illustrated in detail in the following Figures, including flowchart illustrations. It will be understood that each block of the Figures, and combinations of blocks in the Figures, can be implemented by hardware and/or computer program instructions. These computer program instructions may be provided to a processor or other programmable data processing apparatus to produce a machine, such that the instructions which execute on the processor or other programmable data processing apparatus create means for implementing the functions specified in the block or blocks. These computer program instructions may also be stored in a computer-readable memory that can direct a processor or other programmable data processing apparatus to function in a particular manner, such that the instructions stored in the computer-readable memory produce an article of manufacture including instruction means which implement the functions specified in the block or blocks.

Accordingly, blocks of the Figures support combinations of means for performing the specified functions, combinations of steps for performing the specified functions and program instructions for performing the specified functions. It will also be understood that each block of the flowchart illustrations, and combinations of blocks in the flowchart illustrations, can be implemented by special purpose hardware-based computer systems which perform the specified functions or steps, or by combinations of special purpose hardware and computer instructions.

Figure 1:
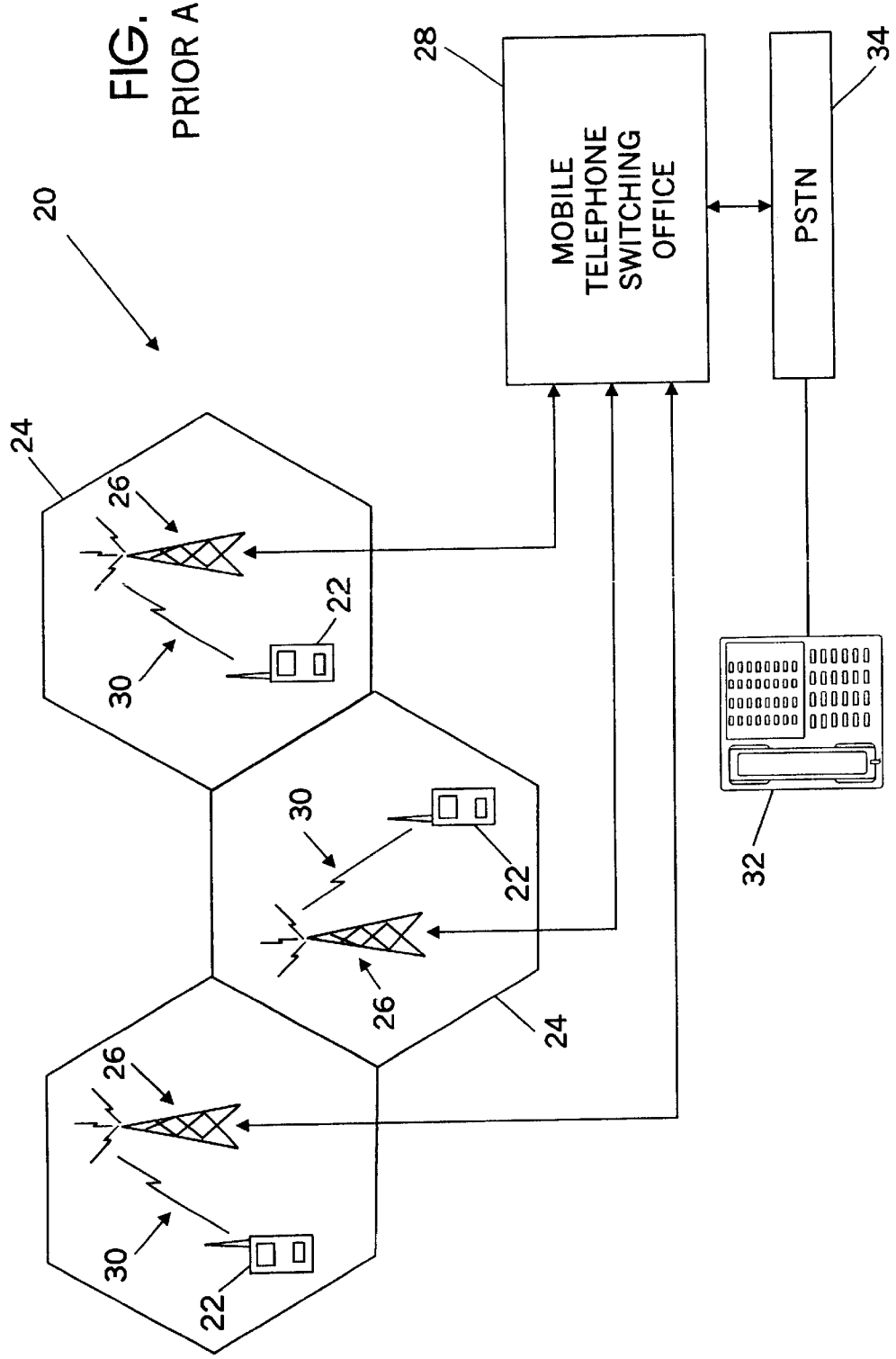
FIG. 1 is a schematic diagram illustrating a conventional terrestrial cellular communications system.
Figure 2:
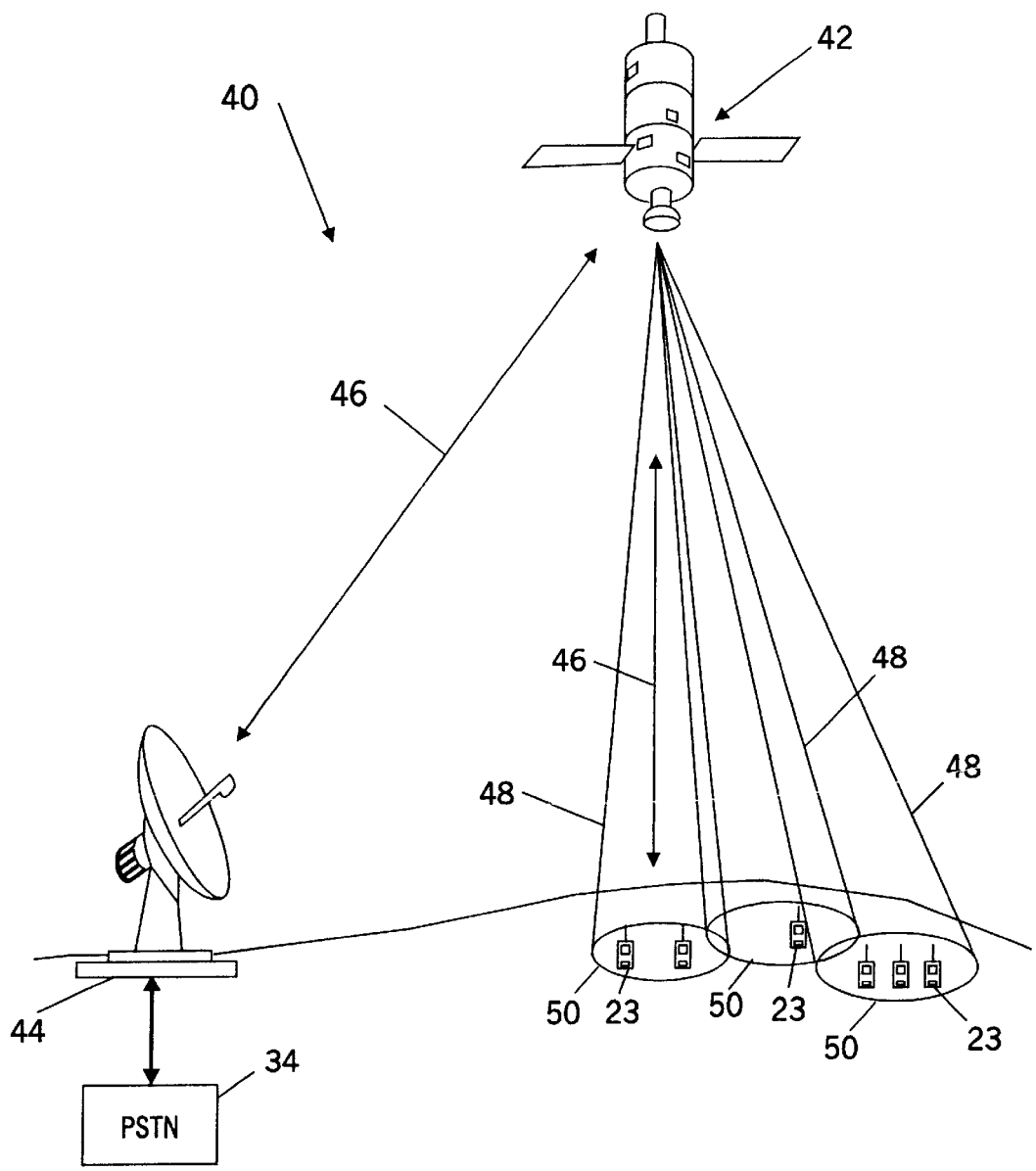
FIG. 2 is a schematic diagram illustrating a conventional satellite based wireless communications system.
Figure 3:
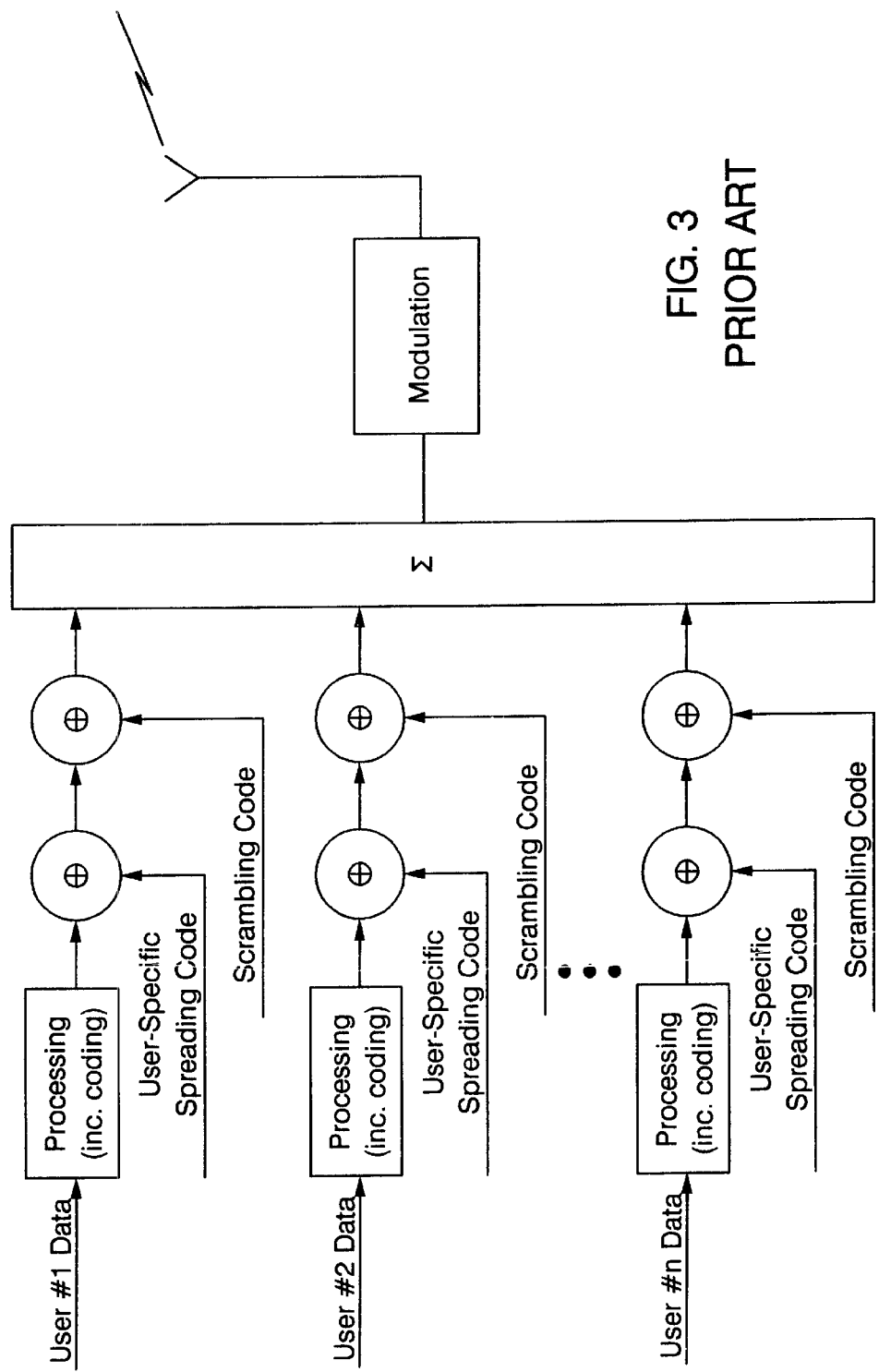
FIG. 3 is a schematic diagram illustrating a conventional wireless base stations.
Figure 4:
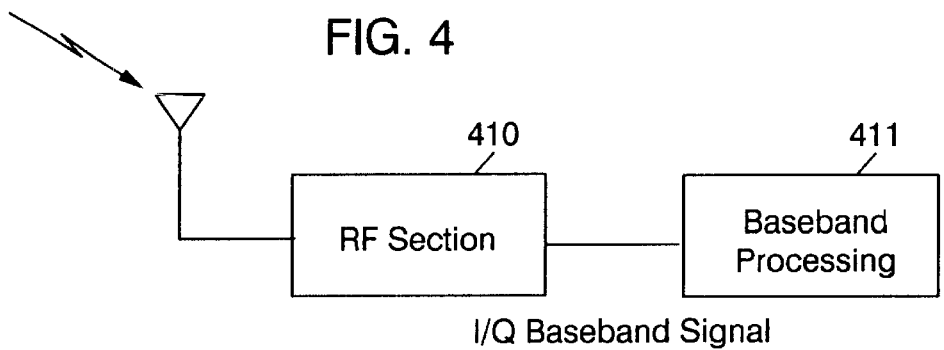
FIG. 4 is a block diagram of direct sequence-spread spectrum CDMA receivers according to the invention.

Referring now to FIG. 4, a block diagram of Direct Sequence-Spread Spectrum (DS-SS) CDMA receivers that can employ variable length accumulation searching according to the present invention is illustrated. As shown in FIG. 4, a received signal is filtered and down-converted to baseband in RF section 410. Baseband processing section 411 processes the in-phase/quadrature (I/Q) baseband signal. As will be described below, the baseband processing section 411 preferably includes a variable length accumulation searcher according to the invention. The design and operation of the RF section 410 and of the baseband processing section 410 apart from the variable length accumulation searcher of the present invention are well known to those having skill in the art and need not be described further herein.

Figure 5:
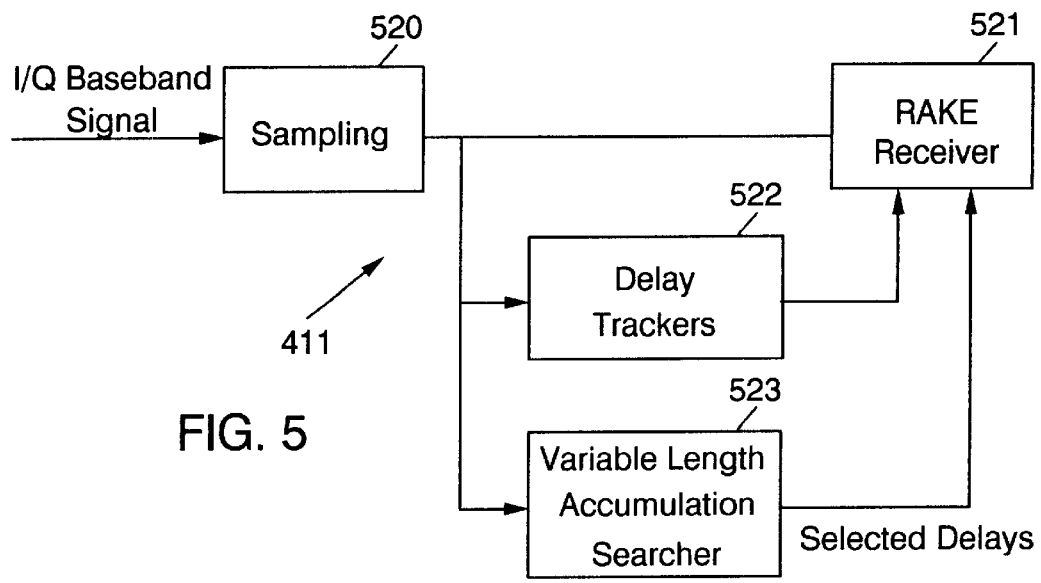
FIG. 5 is a block diagram of direct sequence-spread spectrum CDMA baseband processing using variable length accumulation searching according to the present invention.

Referring now to FIG. 5, the baseband processing section 411 according to the present invention includes a sampling block 520 that samples the I/Q baseband signal. The sampled baseband signal is applied to the delay trackers 522, the variable length accumulation searcher 523 and the RAKE receiver 521.

The variable length accumulation searcher 523 may include one or more complex correlators. These correlators may be conventional integrate and dump correlators and/or sliding correlators similar to those described in U.S. patent application Ser. No. 09/024,120, filed Feb. 17, 1998, to the present inventor Sourour et al., entitled Flexible Sliding Correlator for Direct Sequence Spread Spectrum Systems, assigned to the assignee of the present application, the disclosure of which is hereby incorporated herein by reference. Other types of correlators also may be used.

Figure 6:
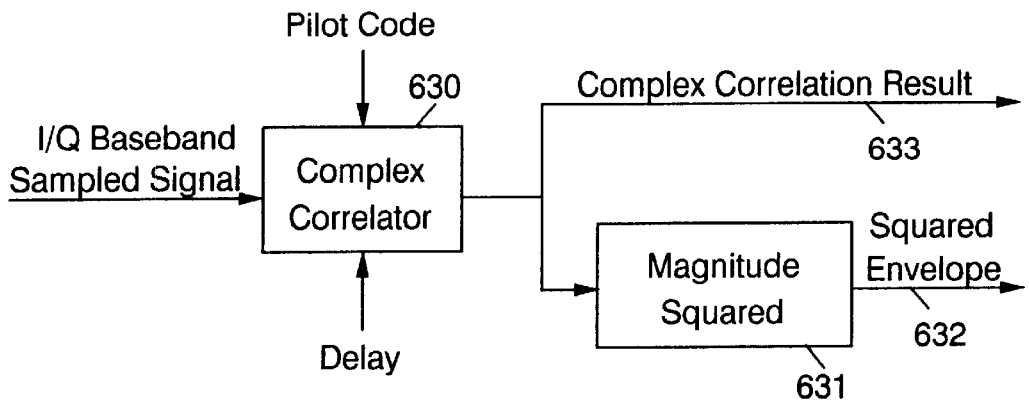
FIG. 6 is a block diagram of a baseband correlator.

Regardless of which type of correlator is used, the correlator preferably is provided with a replica of the pilot spreading code and the delay of the correlation. This is shown in FIG. 6. As shown in FIG. 6, the complex correlator 630 is provided in the I/Q baseband sampled signal, a pilot code and the delay. The output of the complex correlator 630 is available at output terminal 633 as a complex correlation result. In Block 631, the magnitude squared of the correlation results also are calculated. This output is available at an output terminal 632.

As was already described, a conventional technique for generating a search window is to perform correlation of length N chips for each delay in the search window. Therefore, if the search window includes W delays, correlation for each delay is performed for the full length of N chips. This may require considerable power consumption and/or considerable time.

In sharp contrast, according to the present invention, the correlation may be performed in sequential steps. In a first step, a search window including $W_1$ delays is generated. The correlation length for each delay in the search window is $N_1$, which is less than N. In other words, a shorter correlation length is used. From this search window, the set of delays with large correlation results may be selected. The selection can be based on sorting the correlation results and selecting the largest result. Alternatively, the delays whose correlation results exceed a threshold may be selected. Other selection criteria may be used.

This new set forms the delay elements in the second search window which includes $W_2$ elements, where $W_2$ is less than $W_1$. The remaining delays are rejected and no more correlations need be performed for them. Power consumption and/or processing time therefore may be reduced. More correlation then may be performed for the delays in the second search window, with the correlation length of $N_2$ which is less than N. For each delay in the new search window, the correlation results may be accumulated with those from the previous correlation. Accumulation may be performed coherently using the complex correlation result at output terminal 633 or non-coherently using the squared envelope at output terminal 632. Stated differently, for coherent accumulation, the results of output terminal 633 may be added, while for non-coherent accumulation, the results of output of terminal 632 may be added. Alternatively, the correlation results need not be accumulated, but can be reset for each new set of search windows. In yet another alternative, the correlation results may be accumulated for some search windows and may be reset for other search windows.

The above procedure may be repeated iteratively, for example, M times. For each iteration, the search window preferably includes a smaller number of delays $W_{i+1} < W_i$, i=1, 2, M-1. After all M steps are completed the L delays that are provided to the RAKE receiver are selected from the remaining delays in the search window. Each of these remaining delays preferably will have had a total correlation length of $N = \Sigma_{i=1}^{M} N_i$ chips.

Figure 7:
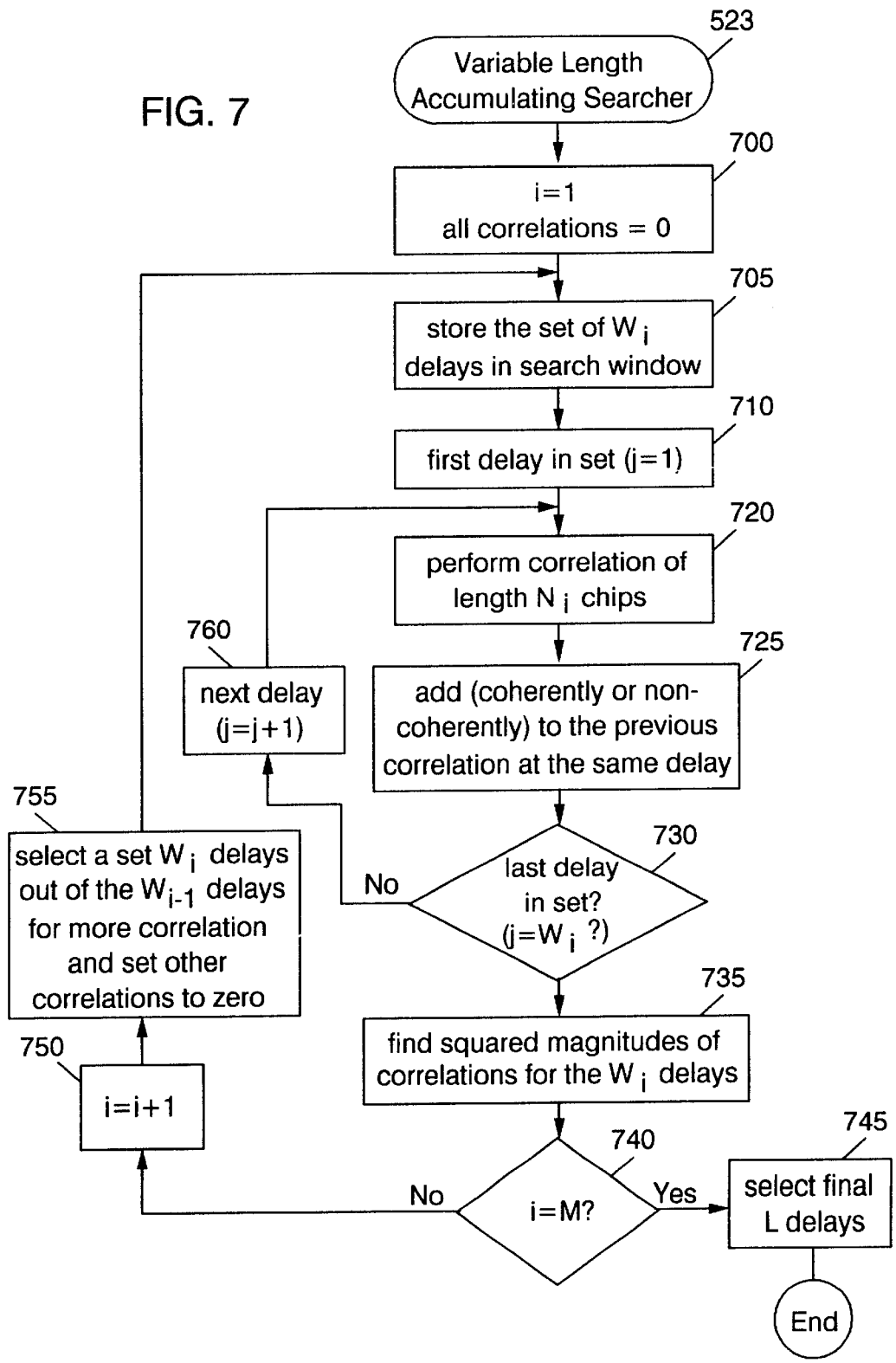
FIG. 7 is a flowchart illustrating variable length accumulation searching according to the present invention.

Referring now to FIG. 7, a detailed embodiment of operations of variable length accumulating searchers 523 now will be provided. At Block 700, all correlations are initialized to zero, and an integer i indicating the search step number is initialized to one. At Block 705, the set of $W_i$ delays are stored. When i=1, the set includes all delays to be searched. Then, at Block 710, the first delay in the set of $W_i$ delays is selected. At Block 720, a correlation of length $N_i$ chips is performed for this delay. When i is greater than one, in Block 725, the correlation result is added, coherently or non-coherently as described above, to the previous correlation(s) for the same delay.

In Block 730, if all $W_i$ delays were considered, operations continue at Block 735. If coherent accumulation was used in Block 725, in Block 735 the squared magnitudes are calculated for all $W_i$ correlations.

Block 740 checks if all the search steps are completed. If not, the integer i is incremented (Block 750) and at Block 755, a set of delays is selected for further correlation. The selection in Block 755 may be based on the squared magnitudes of the correlations. Selection may be performed by sorting all $W_{i-1}$ squared magnitudes and selecting delays corresponding to the largest $W_i$. Alternatively, all $W_{i-1}$ squared magnitudes may be compared to a threshold, and delays corresponding to the squared magnitudes that exceed the threshold may be selected. Preferably, the threshold itself increases as i increases. Combinations of the above techniques and/or other techniques also may be used for selection in Block 755. The correlation results for the delays that are not selected no longer need be processed and, for example, may be set to zero.

When all M steps are completed, in Block 740, operations continue to Block 745. At Block 745, the L delays corresponding to the largest L squared magnitudes are selected. These final L delays may be provided to the RAKE receiver 521 of FIG. 5. It will be understood that the search process may be repeated periodically to search for new paths in the channel. When the search is repeated, it may start at Block 700. Hence, the number of delays to be searched preferably is restarted to the initial value $W_1$.

Figure 8A:
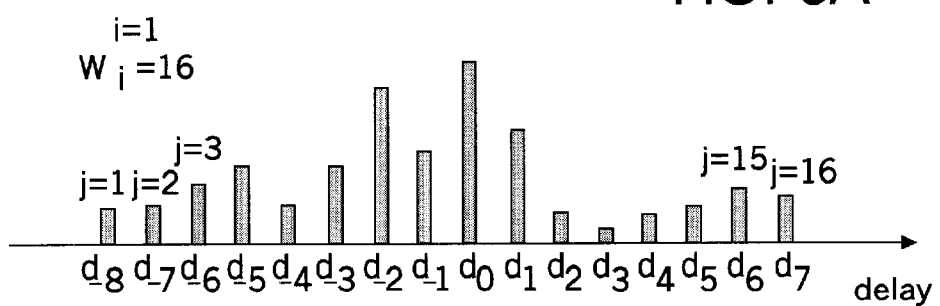
FIGS. 8A–8C are examples of search windows according to the present invention.
Figure 8B:
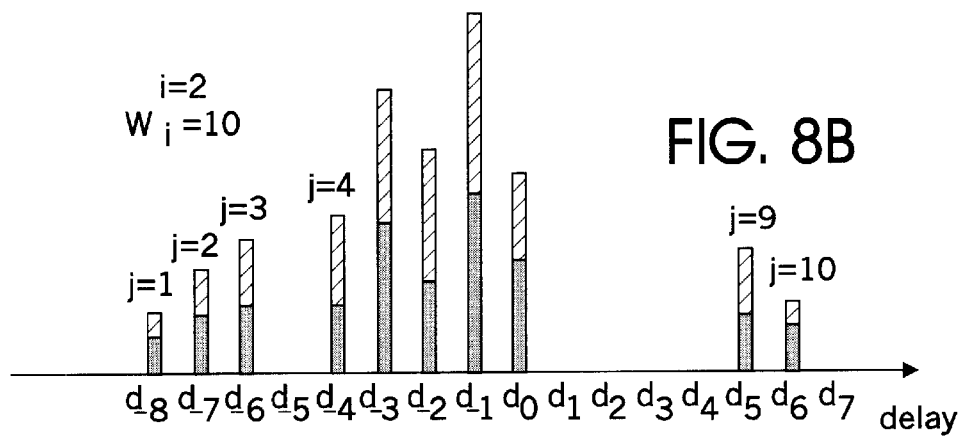
Figure 8C:
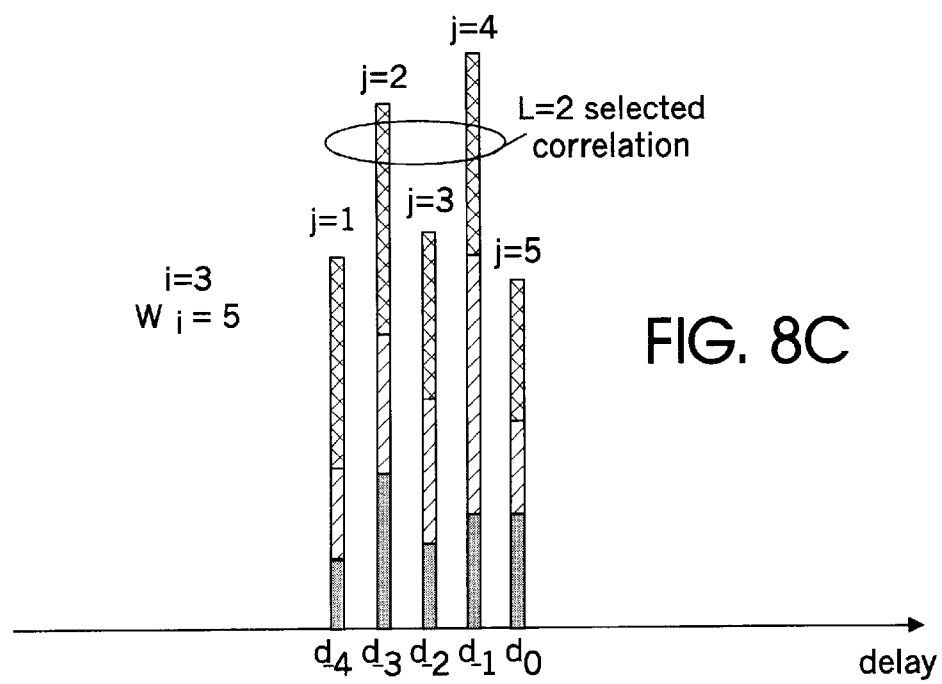

FIGS. 8A–8C illustrate an example of the output of Block 735. In the example of FIGS. 8A–8C, M=3, $W_1$=16 (FIG. 8A), $W_2$=10 (FIG. 8B), $W_3$=5 (FIG. 8C) and L=2. The correlation lengths $N_i$ are equal. The selection in Block 755 is assumed to be based on sorting, to identify the largest $W_i$. In practical DS-SS CDMA systems conforming to the TIA/EIA/IS-95 standard, preferred parameters may be M=3, $W_1$=60, $W_2$=30, $W_3$=10, $N_i$=1024 chips and L=3. A sliding correlator as was described in application Ser. No. 09/024,120 and U.S. Pat. No. 6,157,820 preferably is used.

The ratio between power consumption using conventional searchers and variable length accumulation searchers according to the present invention may be defined by:

$$\text{ratio} = \frac{\sum_{i=1}^{M} N_i W_i}{W_i \sum_{i=1}^{M} N_i}$$

For the preferred IS-95 standard parameters described above, power consumption may be reduced by a factor of 44.4% by using variable length accumulation searchers according to the present invention. A commensurate decrease in processing time also may be obtained.

It will be understood that the present invention may be applied to a pilot channel such as is used in CDMA systems. The present invention also may be applied to pilot symbols that are multiplexed with other channels. Examples of such non-pilot channel systems include wideband CDMA (WCDMA) systems. Finally, the present invention may be used to determine the delays for symbols or signals other than pilot symbols.

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:

1. A method of determining time delays in a spread spectrum signal transmitted in a communications medium according to a spreading sequence, the method comprising the steps of:

receiving a composite signal including the spread spectrum signal from the communications medium;

correlating the composite signal with the spreading sequence according to a first correlation length, over a plurality of time-offsets, to produce a plurality of first time-offset correlations of the composite signal with the spreading sequence;

further correlating the composite signal with the spreading sequence according to a second correlation length that is longer than the first correlation length, over selected ones of the plurality of time-offsets to produce a plurality of second time-offset correlations of the composite signal with the spreading sequence; and selecting at least one of the plurality of second time-offset correlations of the composite signal with the spreading sequence.

2. A method according to claim 1:

wherein the step of further correlating comprises the step of further correlating the composite signal with the spreading sequence according to the second correlation length that is longer than the first correlation length, over selected ones of the plurality of time-offsets having highest correlations with the spreading sequence to produce a plurality of second time-offset correlations of the composite signal with the spreading sequence; and wherein the step of selecting comprises the step of selecting at least one of the plurality of second time-offset correlations of the composite signal having highest correlations with the spreading sequence.

3. A method according to claim 1:

wherein the step of further correlating comprises the step of further correlating the composite signal with the spreading sequence according to the second correlation length that is longer than the first correlation length, over selected ones of the plurality of time-offsets having correlations with the spreading sequence that exceed a first threshold, to produce the plurality of second time-offset correlations of the composite signal with the spreading sequence; and wherein the step of selecting comprises the step of selecting at least one of the plurality of second time-offset correlations of the composite signal having correlations with the spreading sequence that exceed a second threshold.

4. A method according to claim 3 wherein the second threshold is greater than the first threshold.

5. A method according to claim 1 wherein the step of selecting comprises the steps of:

still further correlating the composite signal with the spreading sequence according to a third correlation length that is longer than the second correlation length, over second selected ones of the plurality of time-offsets, to produce a plurality of third time-offset correlations of the composite signal with the spreading sequence; and selecting at least one of the plurality of third time-offset correlations of the composite signal with the spreading sequence.

6. A method according to claim 1 wherein the selecting step is followed by the step of:

providing the at least one of the plurality of second time-offset correlations of the composite signal with the spreading sequence to a RAKE receiver in order to recover information encoded in the spread spectrum signal.

7. A method of determining time delays in a spread spectrum signal transmitted in a communications medium according to a spreading sequence, the method comprising the steps of:

receiving a composite signal including the spread spectrum signal from the communications medium;

correlating the composite signal with the spreading sequence according to a first correlation length, over a plurality of time-offsets, to produce a plurality of first time-offset correlations of the composite signal with the spreading sequence; and further correlating the composite signal with the spreading sequence according to increasingly longer correlation lengths, over decreasingly smaller subsets of the plurality of time-offsets, to produce a final subset of at least one time-offset correlation of the composite signal with the spreading sequence.

8. A method according to claim 7:

wherein the step of further correlating comprises the step of further correlating the composite signal with the spreading sequence according to increasingly longer correlation lengths, over decreasingly smaller subsets of the plurality of time-offsets having highest correlations with the spreading sequence, to produce the final subset of at least one time-offset correlation of the composite signal with the spreading sequence.

9. A method according to claim 7:

wherein the step of further correlating comprises the step of further correlating the composite signal with the spreading sequence according to increasingly longer correlation lengths, over decreasingly smaller subsets of the plurality of time-offsets having correlations with the spreading sequence that exceed increasingly higher thresholds, to produce the final subset of at least one time-offset correlation of the composite signal with the spreading sequence.

10. A method according to claim 7 wherein the step of further correlating is followed by the step of:

providing the at least one of the final subset of at least one time-offset correlation of the composite signal with the spreading sequence to a RAKE receiver in order to recover information encoded in the spread spectrum signal.

11. An apparatus for determining time delays in a spread spectrum signal transmitted in a communications medium according to a spreading sequence, the apparatus comprising:

means for receiving a composite signal including the spread spectrum signal from the communications medium;

means for correlating the composite signal with the spreading sequence according to a first correlation length, over a plurality of time offsets, to produce a plurality of first time-offset correlations of the composite signal with the spreading sequence;

means for further correlating the composite signal with the spreading sequence according to a second correlation length that is longer than the first correlation length, over selected ones of the plurality of time-offsets, to produce a plurality of second time-offset correlations of the composite signal with the spreading sequence; and means for selecting at least one of the plurality of second time-offset correlations of the composite signal with the spreading sequence.

12. An apparatus according to claim 11:

wherein the means for further correlating comprises means for further correlating the composite signal with the spreading sequence according to the second correlation length that is longer than the first correlation length, over selected ones of the plurality of time-offsets having highest correlations with the spreading sequence, to produce the plurality of second time-offset correlations of the composite signal with the spreading sequence; and wherein the means for selecting comprises means for selecting at least one of the plurality of second time-offset correlations of the composite signal having highest correlations with the spreading sequence.

13. An apparatus according to claim 11:

wherein the means for further correlating comprises means for further correlating the composite signal with the spreading sequence according to the second correlation length that is longer than the first correlation length, over selected ones of the plurality of time-offsets having correlations with the spreading sequence that exceed a first threshold, to produce a plurality of second time-offset correlations of the composite signal with the spreading sequence; and wherein the means for selecting comprises means for selecting at least one of the plurality of second time-offset correlations of the composite signal having correlations with the spreading sequence that exceed a second threshold.

14. An apparatus according to claim 13 wherein the second threshold is greater than the first threshold.

15. An apparatus according to claim 11 further comprising:

means for still further correlating the composite signal with the spreading sequence according to a third correlation length that is longer than the second correlation length, over second selected of the selected ones of the plurality of time-offsets, to produce a plurality of third time-offset correlations of the composite signal with the spreading sequence; and wherein the means for selecting comprises means for selecting at least one of the plurality of third time-offset correlations of the composite signal with the spreading sequence.

16. An apparatus according to claim 11 further comprising:

RAKE receiving means that is responsive to the at least one of the plurality of second time-offset correlations of the composite signal with the spreading sequence in order to recover information encoded in the spread spectrum signal.

17. An apparatus for determining time delays in a spread spectrum signal transmitted in a communications medium according to a spreading sequence, the apparatus comprising:

means for receiving a composite signal including the spread spectrum signal from the communications medium;

means for correlating the composite signal with the spreading sequence according to a first correlation length, over a plurality of time-offsets, to produce a plurality of first time-offset correlations of the composite signal with the spreading sequence; and means for further correlating the composite signal with the spreading sequence according to increasingly longer correlation lengths, over decreasingly smaller subsets of the plurality of time-offsets, to produce a final subset of at least one time-offset correlation of the composite signal with the spreading sequence.

18. An apparatus according to claim 17:

wherein the means for further correlating comprises means for further correlating the composite signal with the spreading sequence according to increasingly longer correlation lengths, over decreasingly smaller subsets of the plurality of time-offsets having highest correlations with the spreading sequence, to produce the final subset of at least one time-offset correlation of the composite signal with the spreading sequence.

19. An apparatus according to claim 17:

wherein the means for further correlating comprises means for further correlating the composite signal with the spreading sequence according to increasingly longer correlation lengths, over decreasingly smaller subsets of the plurality of time-offsets having correlations with the spreading sequence that exceed increasingly higher thresholds, to produce the final subset of at least one time-offset correlation of the composite signal with the spreading sequence.

20. An apparatus according to claim 17 further comprising:

RAKE receiving means that is responsive to at least one of the final subset of at least one time-offset correlation of the composite signal with the spreading sequence in order to recover information encoded in the spread spectrum signal.

21. An apparatus for determining time delays in a spread spectrum signal transmitted in a communications medium according to a spreading sequence, the apparatus comprising:

a receiver that receives a composite signal including the spread spectrum signal from the communications medium; and a variable length accumulation searcher that correlates the composite signal with the spreading sequence according to a first correlation length, over a plurality of time-offsets, to produce a plurality of first time-offset correlations of the composite signal with the spreading sequence, that further correlates the composite signal with the spreading sequence according to a second correlation length that is longer than the first correlation length, over selected ones of the plurality of time-offsets, to produce a plurality of second time-offset correlations of the composite signal with the spreading sequence, and that selects at least one of the plurality of second time-offset correlations of the composite signal with the spreading sequence.

22. An apparatus according to claim 21:
wherein the variable length accumulation searcher further correlates the composite signal with the spreading sequence according to the second correlation length that is longer than the first correlation length, over selected ones of the plurality of time-offsets having highest correlations with the spreading sequence, to produce the plurality of second time-offset correlations of the composite signal with the spreading sequence, and selects at least one of the plurality of second time-offset correlations of the composite signal having highest correlations with the spreading sequence.

23. An apparatus according to claim 21:
wherein the variable length accumulation searcher further correlates the composite signal with the spreading sequence according to the second correlation length that is longer than the first correlation length, over selected ones of the plurality of time-offsets having correlations with the spreading sequence that exceed a first threshold, to produce the plurality of second time-offset correlations of the composite signal with the spreading sequence, and selects at least one of the plurality of second time-offset correlations of the composite signal having correlations with the spreading sequence that exceed a second threshold.

24. An apparatus according to claim 23 wherein the second threshold is greater than the first threshold.

25. An apparatus according to claim 21 wherein the variable length accumulation searcher also further correlates the composite signal with the spreading sequence according to a third correlation length that is longer than the second correlation length, over second selected ones of the selected ones of the plurality of time-offsets, to produce a plurality of third time-offset correlations of the composite signal with the spreading sequence, and selects at least one of the plurality of third time-offset correlations of the composite signal with the spreading sequence.

26. An apparatus according to claim 21 further comprising:
a RAKE receiver that is responsive to the at least one of the plurality of second time-offset correlations of the composite signal with the spreading sequence in order to recover information encoded in the spread spectrum signal.

27. An apparatus for determining time delays in a spread spectrum signal transmitted in a communications medium according to a spreading sequence, the apparatus comprising:
a receiver that receiving a composite signal including the spread spectrum signal from the communications medium; and
a variable length accumulation searcher that correlates the composite signal with the spreading sequence according to a first correlation length, over a plurality of time-offsets, to produce a plurality of first time-offset correlations of the composite signal with the spreading sequence, and that further correlates the composite signal with the spreading sequence according to increasingly longer correlation lengths, over decreasingly smaller subsets of the plurality of time-offsets, to produce a final subset as of at least one time-offset correlation of the composite signal with the spreading sequence.

28. An apparatus according to claim 27:
wherein the variable length accumulation searcher further correlates the composite signal with the spreading sequence according to increasingly longer correlation lengths, over decreasingly smaller subsets of the plurality of time-offsets having highest correlations with the spreading sequence, to produce the final subset of at least one time-offset correlation of the composite signal with the spreading sequence.

29. An apparatus according to claim 27:
wherein the variable length accumulation searcher further correlates the composite signal with the spreading sequence according to increasingly longer correlation lengths, over decreasingly smaller subsets of the plurality of time-offsets having correlations with the spreading sequence that exceed increasingly higher thresholds, to produce the final subset of at least one time-offset correlation of the composite signal with the spreading sequence.

30. An apparatus according to claim 27 further comprising:
a RAKE receiver that is responsive to at least one of the final subset of at least one time-offset correlation of the composite signal with the spreading sequence in order to recover information encoded in the spread spectrum signal.

* * * * *